United States Patent

[11] 3,600,678

[72] Inventors Jim C. Garrett;
Robert H. Johnson, both of 3300 East Spring St., Long Beach, Calif. 90806
[21] Appl. No. 857,368
[22] Filed Sept. 12, 1969
[45] Patented Aug. 17, 1971

[54] SOLID-STATE POLARITY TESTER FOR TELEPHONE EQUIPMENT
6 Claims, 5 Drawing Figs.

[52] U.S. Cl. .................................................. 324/133, 324/72.5
[51] Int. Cl. .......................................... G01r19/14, G01r 19/16
[50] Field of Search ........................................... 324/51, 72.5, 133; 340/248, 249

[56] References Cited
UNITED STATES PATENTS

| | | | |
|---|---|---|---|
| 2,476,115 | 7/1949 | Runbaken | 324/72.5 UX |
| 2,993,172 | 8/1961 | Karlicek | 324/133 |
| 3,157,870 | 11/1964 | Marino et al. | 324/133 X |
| 3,311,907 | 3/1967 | Teal | 340/248 |
| 3,452,656 | 7/1969 | Ruhle et al. | 340/248 UX |
| 3,525,939 | 8/1970 | Cartmell | 324/133 |

FOREIGN PATENTS

| | | | |
|---|---|---|---|
| 1,072,209 | 6/1967 | Great Britain | 324/133 |

Primary Examiner—Gerard R. Strecker
Attorney—Hyman Jackman

ABSTRACT: A solid-state polarity tester provided with ground and battery terminals for connection to like contacts of a battery in a telephone central office switchroom, and with a probe to test polarity of telephone equipment, the same embodying two similar circuits between the probe and each respective terminal, each said circuit including an indicator lamp and a transistor that switches on to close the circuit through one lamp according to the direction of current flow, and shorting out the other lamp. The tester includes a third circuit between the probe and the ground terminal and including a glow tube energized to indicate either high-level DC or AC in contact with the probe.

PATENTED AUG 17 1971  3,600,678
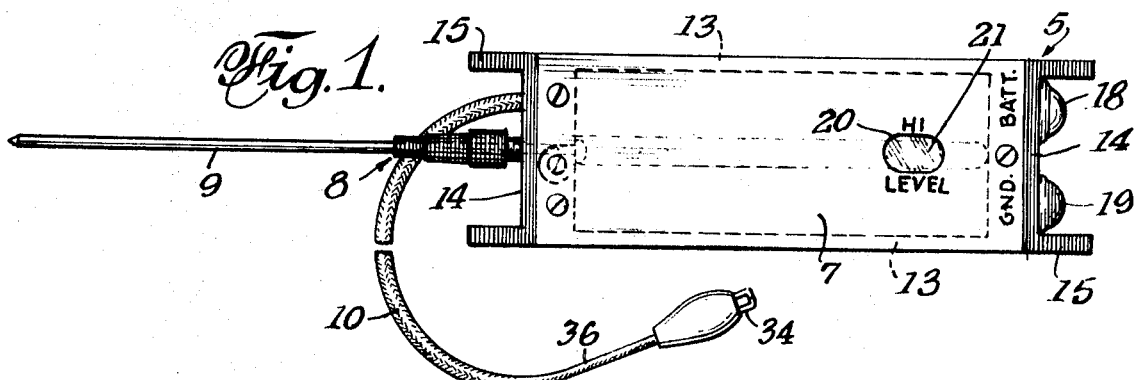
Fig.1.
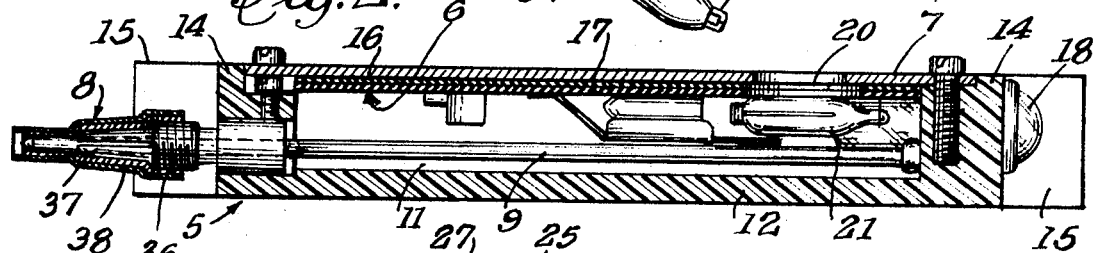
Fig.2.
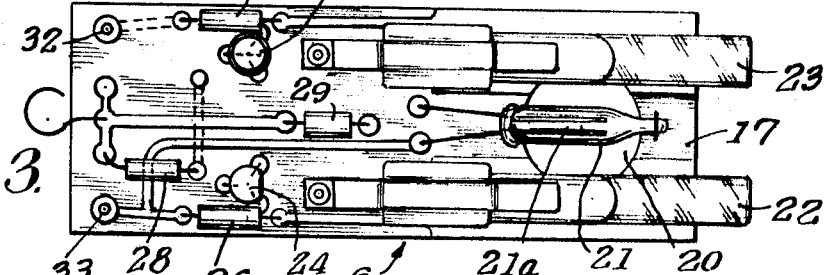
Fig.3.
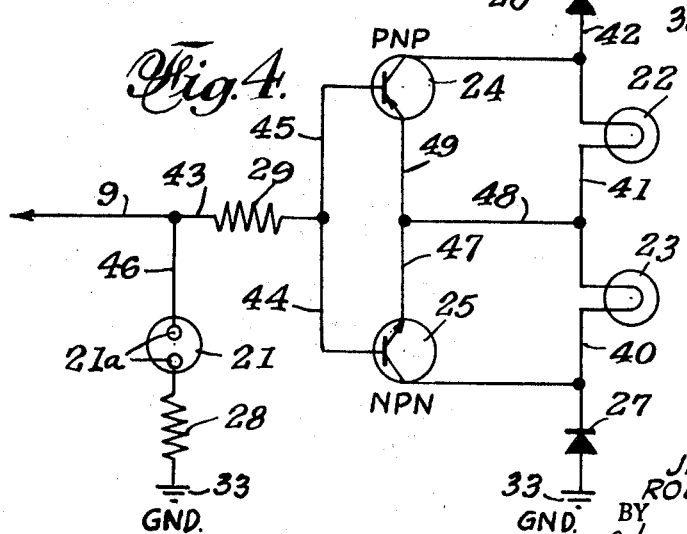
Fig.4.
Fig.5.
INVENTORS
JIM C. GARRETT
ROBERT H. JOHNSON
BY
Hyman Jackman
ATTORNEY

SOLID-STATE POLARITY TESTER FOR TELEPHONE EQUIPMENT

BACKGROUND OF THE INVENTION

1. Field of the Invention

Testing for polarity of various terminals of central office telephone installations ordinarily entails the use of expensive test apparatus requiring to be carted from place to place. Such apparatus frequently is combined with other testing means, thereby being rendered incapable of being formed as a pocket-size implement, as contemplated in this invention.

2. Description of the Prior Art

The art known to the applicants is:

Kamper, U.S. Pat. No. 2,229,927, dated Jan., 1941; Linton, U.S. Pat No. 2,575,279, dated Nov., 1951; Belart, U.S. Pat. No. 2,849,681 dated Aug., 1958; Henel, U.S. Pat. No. 2,956,229, dated Oct., 1960, and Gosselin, French Pat. No. 1,210,441, dated Mar., 1960.

SUMMARY OF THE INVENTION

The present instrument is more particularly devised for use in the telephone industry for indicating 48-v. negative battery or positive ground; for reading AC ringing generator or high-level DC without operating switches; and for carrying out the above functions on the same circuit.

The invention has for its objects to provide an instrument, as above, of pocket size for ready availability to preform the above-listed testing functions and, generally, as an aid for testing telephone equipment and shooting trouble; to check for 48-v. battery or ground in the telephone company switchroom without changing connections; to provide for checking ringing generator; to provide a means for convenient storing of the electrical conductors during periods of nonuse; and to provide for retraction of the probe during nonuse.

BRIEF DESCRIPTION OF THE DRAWING

In the drawing, like reference characters designate similar parts in the several views.

FIG. 1 is a plan view of a polarity tester according to the invention, with the probe thereof in extended position.

FIG. 2 is an enlarged longitudinal sectional view thereof, with the probe in retracted, nonoperative position.

FIG. 3, to the scale of FIG. 2, is a bottom plan view of a circuit board component of the polarity tester, the same mounting the electrical elements thereof.

FIG. 4 is a wiring diagram showing the electrical connections between the electrical elements of the tester.

FIG. 5 is a broken elevational view of a 310 plug common to the telephone industry.

DESCRIPTION OF THE PREFERRED EMBODIMENT

The present testing device comprises, generally, an elongated dielectric body or case 5, an electric circuit board assembly 6 fitted to said body, a cover plate 7 removably connected to the body and enclosing the circuit board assembly, a chuck 8 carried by one end of said body, a probe 9 secured to the body by the chuck 8 in selected extended and retracted positions, and an electrical connection cord 10 connected to the circuit board assembly 6 and extending from the body, preferably from the end thereof which carries the chuck 8.

The body or case 5 is preferably molded of a synthetic resin or like plastic and formed to have an elongated interior space 11 defined by a bottom wall 12, sidewalls 13 and end wall 14. Oppositely directed pairs of lugs 15 extend from the sidewalls 13, the same forming end recesses that retain the turns of the connection cord 10 when wrapped lengthwise around the body in the out-of-use condition of the tester. The cover plate 7 encloses the space 11. In this case, an insulating member 16 is interposed between the cover plate 7 and the circuit board assembly 6, the latter being disposed in the cavity or space 11 with the elements mounted thereon between the board 17 of said assembly and the bottom wall 12 of the case.

The end of the case 5 opposite the chuck 8 is provided with two transparent jewels 18 and 19 in side-by-side relation—one of them white and the other red. Also, the plate 7, member 16 and the board 17 are provided with registering holes 20.

The board 17 of the circuit board assembly 6 mounts a gaseous-discharge glow tube 21 located so as to be visible through the registering holes 20, and test lamps 22 and 23, the former in register with and, when lit, causing the white jewel 18 to glow, and the latter, when lit, causing the red jewel 19 to glow. Test lamps, such as lamps 22 and 23, used in the telephone industry, can indicate only one potential at a time. The connecting circuit must be changed to indicate another potential. The same cannot read high-level DC or AC without burning out. The glow tube 21 is provided with elongated electrodes 21a, said tube being so located with relation to the registering holes 20 as to be visible therethrough.

Said board 17 also mounts transistors 24 and 25 (respectively PNP and NPN), diodes 26 and 27, a resistor 28 in the grounded side of the glow tube, and a second resistor 29. Said board 17 is also provided with a battery terminal 32 and a ground terminal 33. The central office 48-v. battery is adapted to be connected, by means of terminals 32 and 33 to the respective clips 34 and 35 on the ends of conductors 36 and 37 extending through the cord 10, as in FIG. 1, to the terminals 32 and 33 to, respectively, bring battery and ground to said terminals. FIG. 5 shows a typical 310 plug 10a that may be used instead of the cord 10 for central office installations equipped to accept the same, the tip 34a being battery and the sleeve 35a being ground.

The chuck 8 comprises a bushing 36 extending from the end wall 14 that is opposite the wall that mounts the jewels 18 and 19, the same having a split end 37. The chuck includes an insulation-covered collet 38 threadedly engaged with the chuck and adapted to compress the bushing end 37 to clamp the probe 9, which extends therethrough.

Circuit Explanation:

Connect the terminals 34 and 35, or the 310 plug, to a central office 48-v. battery—battery to the tip and ground onto the sleeve. With battery and ground thus connected to the device, a circuit is established wherein ground will flow through diode 27 and conductor 40 to lamp 23, and conductor 41 to lamp 22, and through line 42 and diode 26 to battery.

When the extended probe 9 comes into contact with ground, a circuit is established wherein the current flow is through line 43 to the resistor 29 and conductor 44 to the base of the NPN transistor 25, turning the same on, shorting out the lamp 23, and causing the lamp 22 to burn fully.

When the probe 9 comes into contact with battery, a circuit is established wherein the current flow is through said line 43 and resistor 29 to the conductor 45 to the base of the PNP transistor 24, turning the same on, shorting out lamp 22 and causing the lamp 23 to burn fully.

The diodes 26 and 27 are provided to protect the circuit should the battery and ground connections be reversed.

When the probe 9 comes into contact with high-level DC, the flow from the probe will be through line 46, through the glow tube 21, and through resistor 28 to ground, causing one electrode 21a or the other of said tube to glow, depending on the direction of the potential of the DC voltage. The polarity-indicating lamps are functional for high-level DC polarities; also, white indicates negative (−) and red indicates positive (+).

When AC is encountered by the probe 9, the current flows to the glow lamp 21, through resistor 28 to ground, and causes said tube to glow on one side or the other due to the cycling current.

From the diagram of FIG. 4, it will be seen that a circuit from the probe 9 to the battery terminal 32 includes the resistor 29, the conductor 44, NPN transistor 25, conductors 47 and 48, lamp 22, and diode 26. When the probe 9 encounters ground, this circuit is made, turning on the NPN transistor and illuminating lamp 22. As a consequence, the white jewel 18 will glow. The lamp 23, being shorted out by said circuit, will remain dark.

From FIG. 4, it will also be seen that a circuit from the probe 9 to the ground terminal 33 includes the resistor 29, the conductor 45, PNP transistor 24, conductors 49 and 48, lamp 23, and diode 27. When the probe 9 encounters battery, this latter circuit is made, turning on the PNP transistor and illuminating lamp 23. As a consequence, the red jewel 19 will glow. The lamp 22, being shorted out by said latter circuit, will remain dark.

Since test lamps in telephone equipment can indicate only one potential at a time, the connections thereto require to be changed to indicate another potential. These lamps cannot read high-level DC or AC without burning out.

While the foregoing has illustrated and described what is now contemplated to be the best mode of carrying out the invention, the construction is, of course, subject to modification without departing from the spirit and scope of the invention.

Having thus described the invention, what we claim and desire to be secured by Letters Patent is:

1. A polarity-testing instrument provided with ground and battery terminals adapted for connection to the ground and negative contacts, respectively, of a battery in a telephone central office switchroom, said instrument comprising:
   a. a ground terminal
   b. a battery terminal
   c. a series circuit connecting said ground terminal to said battery terminal, said series circuit including first and second diodes adjacent said ground and battery terminals, respectively, and first and second lamps adjacent said first and second diodes, respectively, and in series therewith, said first and second diodes being connected for current flow in said series circuit from said ground terminal to said battery terminal,
   d. a probe
   e. a first transistor having first and second terminals connected to said series circuit across said first lamp and having a third terminal connected to said probe,
   f. a second transistor having first and second terminals connected across said second lamp and having a third terminal connected to said probe,
   g. one of said transistors being a NPN transistor and the other a PNP transistor,
   h. a second circuit formed when said probe contacts a ground potential, said second circuit including said probe, said first transistor, said second lamp, said second diode and said battery terminal, whereby said first transistor turns on thereby shorting out said first lamp, and a current flows from said ground terminal through said first diode, said first transistor, said second lamp and said second diode to said battery terminal causing said second lamp to illuminate,
   i. a third circuit formed when said probe contacts a battery potential, said third circuit including said probe, said second transistor, said first lamp, said first diode and said ground terminal, whereby said second transistor turns on thereby shorting out said second lamp, and a current flows from said ground terminal through said first diode, said first lamp, said second transistor, and said second diode to said battery causing said first lamp to illuminate.

2. A polarity-testing instrument according to claim 1 in which a resistor common to said second and third circuits is interposed between said probe and said third terminals of said transistors in said circuits.

3. A polarity-testing instrument according to claim 1, provided with a fourth circuit between the probe and ground, the same including a glow tube adapted to glow when the probe encounters either high-level DC or AC.

4. A polarity-testing instrument according to claim 2, provided with a fourth circuit between the probe and ground, the same including a glow tube adapted to glow when the probe encounters either high-level DC or AC.

5. A polarity-testing instrument according to claim 3, provided with a resistor between the glow tube and ground.

6. A polarity-testing instrument according to claim 4, provided with a resistor between the glow tube and ground.